United States Patent [19]

Scharting et al.

[11] Patent Number: 4,576,382
[45] Date of Patent: Mar. 18, 1986

[54] PROTECTIVE CAP FOR THE SEALING OF A BUSHING AROUND A PIN IN A CARDAN JOINT

[75] Inventors: Günter Scharting, Gochsheim; Steffen Neugebauer, Hesselbach, both of Fed. Rep. of Germany

[73] Assignee: FAG Kugelfischer Georg Schafer (KGaA), Fed. Rep. of Germany

[21] Appl. No.: 753,413

[22] Filed: Jul. 10, 1985

[30] Foreign Application Priority Data

Aug. 1, 1984 [DE] Fed. Rep. of Germany ....... 3428389

[51] Int. Cl.$^4$ .................. F16J 15/24; F16C 33/76
[52] U.S. Cl. ............................ 277/12; 277/84; 277/152; 277/166; 277/95; 384/482; 384/489
[58] Field of Search ............... 277/82, 84, 95, 166, 277/12, 32, 152; 384/481, 482, 489

[56] References Cited

U.S. PATENT DOCUMENTS

| | | | |
|---|---|---|---|
| 2,338,169 | 1/1944 | Dunn | 384/482 X |
| 2,945,707 | 7/1960 | Wasley | 277/82 X |
| 3,377,820 | 4/1968 | Smith | 277/82 X |
| 3,536,332 | 10/1970 | Pitner | 277/84 X |
| 3,770,992 | 11/1973 | Veglia | 384/489 |
| 4,021,085 | 5/1977 | Willyard | 384/482 |

Primary Examiner—Robert S. Ward
Attorney, Agent, or Firm—Ostrolenk, Faber, Gerb & Soffen

[57] ABSTRACT

In a bushing around a pin, where the bushing is separated from the pin by a series of rollers, as in the pin of a cardan joint, the free space between the bushing and the pin is closed by an axially short packing. An annular protective cap disposed over the packing extends around the pin. The cap has a radially extending section that extends over the axial end of the packing and has an axially extending section covering the packing and extending toward the bushing. A rib inside the radially extending section of the cap extends into a cooperatingly shaped groove in the adjacent radially extending surface of the packing so that the protective cap is elastically held to the packing. The outer end of the rib is thickened and the bottom of the groove is correspondingly widened for holding the cap to the packing.

9 Claims, 1 Drawing Figure

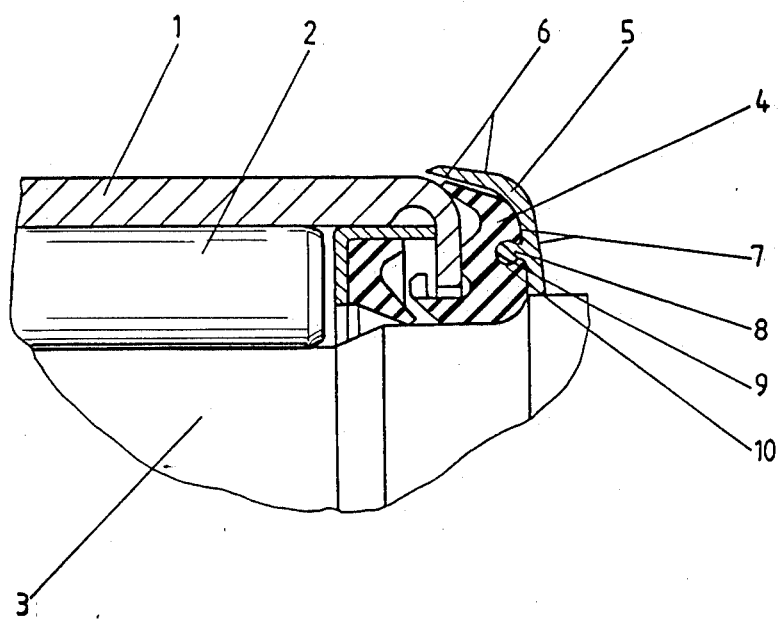

PROTECTIVE CAP FOR THE SEALING OF A BUSHING AROUND A PIN IN A CARDAN JOINT

BACKGROUND OF THE INVENTION

The present invention relates to a protective cap for sealing a packing at the end of a bushing, particularly for use in a cardan joint, and relates to means for attaching the cap.

A protective cap of this type is shown in German Utility Model No. 19 94 896. In that case, the sleeve or bushing and the pin have approximately the same diameter outside of the bearing. To this extent, the cap has a substantial axial length. Such an embodiment may not be usable when the pin is of substantially smaller diameter than the bushing. In that case, a packing in accordance with Federal Republic of Germany Application No. DE-OS 21 44 172 is used, which is very short axially and which, on the other hand, has a large radial length.

SUMMARY OF THE INVENTION AND DESCRIPTION OF THE DRAWING

The object of the invention is to improve a protective cap for a packing of a bushing that extends around a pin, wherein the radially directed surfaces of an axially short packing are covered while, nevertheless, the protective cap is dependably attached to the packing.

The protective cap of the invention is especially useful for a packing that covers the free space between the outer race of a bearing or bushing and its inner race, and particularly the free space between the outer race of the bearing or bushing and the inner race defined on the pin portion of a cardan joint. A cardan joint, or universal coupling, has a spider element with a plurality of projecting pins. Each of the pins is surrounded by a bushing that is spaced away from it. Interposed between the interior of the bushing and the exterior of the pin are rollers, with the bushing and the pin serving respectively as the outer end in the races for the rollers.

The packing for which the protective cap is provided closes the free space between the outer race of the bearing or pushing and the pin of the cardan joint. The packing is of elastic material, at least in the vicinity of its below-described cap anchoring groove. The protective cap annularly surrounds the portion of the pin projecting past it. The cap has a radially extending portion which extends over the packing from the bushing up to the pin. The cap also has an axially directed section that extends down around the outside of the packing and toward the bushing. In this way, the cap covers the packing.

For holding the cap to the packing, the packing has a groove defined into its axial end, radially directed surface, and particularly a circumferential groove, and the cap has a correspondingly placed cooperating rib, and particularly a circumferential rib, which extends into the groove. It is possible for the rib and groove to alternatively be on the packing and the cap, respectively. For anchoring the cap to the packing, the outer end of the rib is provided with a thickening, and the groove has a correspondingly shaped widened opening in the packing. The engagement of the rib from the cap into the groove in the elastic packing holds the cap to the packing by elastic spring action.

The axially short packing is well covered at all free places and is protected by the radial and axial sections of the protective cap. The protection, for instance, is against impact by stones when the protective cap is made as a separate part of suitable material and is without sealing functions. The attachment is effected via a substantially axially directed rib which engages with elastic spring action inside a groove defined in the packing. With this arrangement, subsequent attachment of the protective cap to the packing can also be effected, if necessary. This would have the further advantage that the packing, upon being pushed into position, would be stiffened by the protective cap. That cap consists of a material of less elasticity so that its mounting would not be made difficult.

A dependable attachment between the protective cap and the packing is obtained when the rib from the cap is provided at its outer end with a thickening which engages into the correspondingly shaped widened groove in the packing.

The invention is described further with reference to the drawing, which shows a partial cross-section through the cardan joint.

DESCRIPTION OF A PREFERRED EMBODIMENT

A cardan joint includes a spider (only a part of which is shown) with a plurality of projecting pins, only one of which is shown. At each pin there is a hollow bushing 1, rollers 2 disposed around the inside of the bushing and in contact with it, a central pin 3 on which the rollers roll, an elastic material packing 4 at the open axial end of the bushing and a more rigid protective cap 5 over the packing. The cap 5 covers both the axial and the radial surfaces of the packing 4 through the correspondingly shaped axially directed and radially directed sections 6 and 7, respectively, of the cap.

The packing 4 and the protective cap 5 are attached through the cap being provided on the underside of its radially directed region 7 with an approximately axially directed rib 8 that is received in a correspondingly placed and shaped groove 10 in the packing. The rib 8 has a thickening 9 on its outer end which engages into the correspondingly widened shaped groove 10 in the packing 4. At least the packing 4 consists of an elastic plastic material, which enables a simple snap attachment between the cap and the packing, which is easily mounted and removed.

Although the present invention has been described in connection with a preferred embodiment thereof, many variations and modifications will now become apparent to those skilled in the art. It is preferred, therefore, that the present invention be limited not by the specific disclosure herein, but only by the appended claims.

What is claimed is:

1. A protective cap for a packing for a bushing, which comprises an outer bushing carrying an outer race, an inner race inside and spaced away from the outer race for defining a free space between the races; a protective packing of generally elastic material for covering and filling the free space between the outer bushing and the inner race; the packing being at the axial end of the bushing; a plurality of rollers disposed in the free space and rollingly contacting the outer race of the bushing and the inner race;

the cap having a radial section extending radially inward over the packing and having an axial section extending axially down along the packing toward the bushing;

one of the packing and the cap having a groove defined therein on the radially extending section thereof and the other of the packing and the cap having a rib defined thereon placed thereon for engaging into the groove, for holding the cap to the packing.

2. The cap and packing combination of claim 1, wherein the rib and groove are substantially axially directed.

3. The cap and packing combination of claim 1, further comprising a pin on which the inner race is defined and around which the rollers can rotate, and the packing extends from the bushing which is spaced from the pin to cover the free space and extends to the pin.

4. The cap and packing combination of claim 3, wherein the rib and the groove are shaped to extend circumferentially around the pin.

5. The cap and packing combination of claim 4, wherein the groove is defined in the packing and the rib is defined in the cap.

6. The cap and packing combination of claim 5, wherein the rib is held in the groove by the elastic spring action of the packing of elastic material.

7. The cap and packing combination of claim 6, wherein the rib has an outer end thereof which is thickened; the groove having an inner end thereof which is correspondingly shaped wider, for holding the rib in the packing for holding the cap to the packing.

8. The cap and packing combination of claim 5, wherein the pin is of a length to extend past the packing and the packing annularly surrounds the pin.

9. The cap and packing combination of claim 3, wherein the pin is of a length to extend past the packing and the packing annularly surrounds the pin.

* * * * *